United States Patent
Ramakrishnan et al.

(10) Patent No.: US 8,219,510 B2
(45) Date of Patent: Jul. 10, 2012

(54) METHOD FOR DETERMINING DISTRIBUTIONS OF UNOBSERVED CLASSES OF A CLASSIFIER

(75) Inventors: Bhisksha Raj Ramakrishnan, Pittsburgh, PA (US); Evandro Bacci Gouvêa, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 32 days.

(21) Appl. No.: 12/413,585

(22) Filed: Mar. 29, 2009

(65) Prior Publication Data

US 2011/0131155 A1    Jun. 2, 2011

(51) Int. Cl.
G06F 15/18 (2006.01)
G06F 17/00 (2006.01)
G06F 9/44 (2006.01)
G06N 5/02 (2006.01)
G06N 7/02 (2006.01)
G06N 7/06 (2006.01)

(52) U.S. Cl. ............... 706/12; 706/48; 706/52
(58) Field of Classification Search .......... 706/12, 706/14, 46, 48, 52
See application file for complete search history.

(56) References Cited

U.S. PATENT DOCUMENTS

| | | | |
|---|---|---|---|
| 6,438,519 B1 * | 8/2002 | Campbell et al. | 704/243 |
| 7,043,492 B1 * | 5/2006 | Neal et al. | 341/87 |
| 7,646,894 B2 * | 1/2010 | Yang et al. | 382/115 |
| 2007/0055530 A1 * | 3/2007 | Onishi | 704/275 |
| 2009/0323798 A1 * | 12/2009 | He et al. | 375/240.01 |
| 2010/0138223 A1 * | 6/2010 | Koshinaka | 704/245 |

OTHER PUBLICATIONS

Jebara, T. "Discriminative, Generative and Imitative Learning", Thesis, Massachusetts Institute of Technology, Feb. 2002. 212 pages.*
Kuhn, R. et al. "Rapid Speaker Adaptation in Eigenvoice Space", IEEE Transactions on Speech and Audio Processing, vol. 8, No. 6, Nov. 2000. pp. 695-707.*
Zivkovic, Z. et al. "Recursive Unsupervised Learning of Finite Mixture Models", IEEE Transactions on Pattern Analysis and Machine Intelligence, vol. 26, No. 5, May 2004. pp. 651-656.*
Berisha, V. et al. "Making Decisions About Unseen Data: Semi-Supervised Learning at Different Levels of Specificity", 2010 Conference Record of the 44th Asilomar Conference on Signals, Systems and Computers (ASILOMAR), IEEE 2010. pp. 75-79.*

* cited by examiner

*Primary Examiner* — Jeffrey A Gaffin
*Assistant Examiner* — Benjamin Buss
(74) *Attorney, Agent, or Firm* — Dirk Brinkman; Gene Vinokur

(57) ABSTRACT

A distribution of an unobserved class for a classifier with no known training data is learned by first determining, for each known class, known distribution using known training data. Sufficient statistics of the distribution of the unobserved class are determined from the known distributions and the training data associated with each known class. If the known training data and the known distributions are bounded, then update parameters of the distribution of the unobserved class from the sufficient statistics, else update the parameters from sufficient statistics and a priori probability distributions that specify the distributions of the parameters.

13 Claims, 5 Drawing Sheets

METHOD FOR DETERMINING DISTRIBUTIONS OF UNOBSERVED CLASSES OF A CLASSIFIER

FIELD OF THE INVENTION

This invention relates generally to determining distributions of classes in a classifier, and more particularly to determining distributions of unobserved classes.

BACKGROUND OF THE INVENTION

Pattern classification methods and systems classify input data as belonging to one of several classes based on a statistical match between the data and known distributions of the classes. In many classification applications, such as speaker identification and face recognition, the application may also be required to detect that some input data does not match any of the known classes. This "lack of match" is typically referred to as a rejection.

One approach compares the measured probability of the data, as given by the distributions of all known classes, against a threshold and determines that any data with a probability less than the threshold are rejected, i.e., the data do not belong to any of the known classes.

Another approach represents all data that do not belong to any of the known classes as a class with a distribution of its own, i.e., this class is other. In the art of statistics and classifiers, the other class is generally referred to as the garbage class.

Any input data with a probability, as measured by the distribution of the garbage class, that exceeds a threshold is rejected. For example, distributions for audio signals of speech for speakers $S_i$, i=1, ..., N are $P_i(X)$. Given a recording X of speech from an unobserved speaker different than any of the speakers $S_1 ... S_N$, the method determines the probability of the garbage class $P_{N+1}(X)$, and determines from its value that the speaker is indeed unobserved.

Often, no training data are available to represent the garbage class. In the example application of speaker identification, if there are data belonging to speaker $S_{N+1}$ in the garbage class, then one can train the classifier for the distribution for that speaker. However, one is still left with the problem that additional other speakers remain unobserved. So, one must now determine a probability distribution for the totality of all unobserved speakers in the garbage class and not represented by the training data set, in order to determine the distribution of unobserved speakers in the garbage class.

SUMMARY OF THE INVENTION

The embodiments of the invention provide a method for determining a distribution of an unobserved class for which there are no training data by inference from data belonging to known classes and their distributions.

Formally, training data sets $\Delta_i$, i=1, ..., n belong respectively to classes i=1, ..., N. From these sets and classes, the method determines a distribution of the unobserved class $C_{N+1}$.

A distribution of an unobserved class for a classifier with no known training data is learned by first determining, for each known class, known distribution using known training data.

Sufficient statistics of the distribution of the unobserved class are determined from the known distributions and the training data associated with each known class.

If the known training data and the known distributions are bounded, then update parameters of the distribution of the unobserved class from the sufficient statistics, else update the parameters from sufficient statistics and a priori probability distributions that specify the distributions of the parameters.

DETAILED DESCRIPTION OF THE PREFERRED EMBODIMENT

The embodiments of the invention provide a method for determining a distribution of an unobserved class for which there is no training data. We use a discriminative training procedure to determine the distributions of all known and unobserved classes.

Discriminative training procedures include among others minimum classification error (MCE) training, minimum phone error (MPE), minimum word error (MWE), maximum mutual information (MMI) training, and maximum-margin training. All of these procedures have similar determining mechanisms for determining class distributions. This description applies to all such training procedures.

Distinction Between Maximum Likelihood and Discriminative Training

Maximum Likelihood Training

A common procedure to determine the distribution of a class of data uses a maximum likelihood technique. Here, only known data for a particular class are used to determine the distribution of the class. The general procedure is to accumulate sufficient statistics from the data, and determine the parameters of the distribution from the sufficient statistics.

In statistics, sufficiency is the property possessed by a statistic, with respect to a parameter, when no other statistic which can be determined from the same data provides any additional information as to the value of the parameter.

For example, given training data $X=\{X_1, X_2, ..., X_K\}$ for a known class, and assuming the distribution of the data is Gaussian, then the sufficient statistics for the class are:

$N_m = \Sigma_i X_i$, and
$N_v = \Sigma_i X_i^2$.

The mean and variance of the Gaussian distribution are $\mu = N_m/K$ and $\sigma = N_v/K - \mu^2$, respectively.

Each data point $X_i$ associates with the distribution. The final distribution is one that best accounts for the association from each of the data points. Note that each distribution is independent of the other distributions, i.e., data used to determine one distribution are used for that distribution alone.

Discriminative Training

A discriminative training procedure determines distributions of all known classes, such the distributions that are most suited identify given data point with the given class or not, i.e., the data are optimal for classification, but do not necessarily explain the distribution of the data well.

Figure 1:
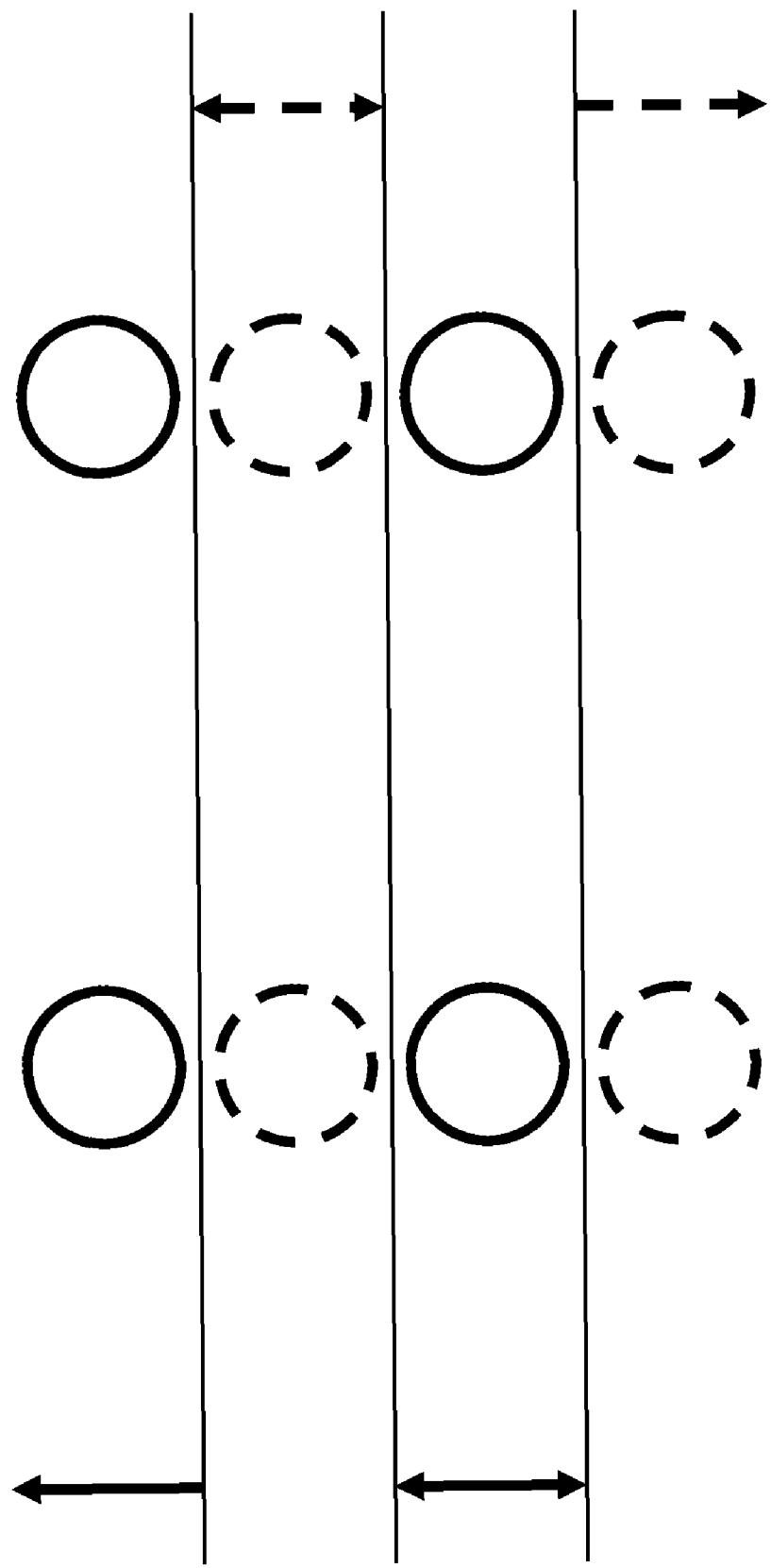
FIGS. 1-3 are schematics distinguishing actual distribution and distributions determined using discriminative training.
Figure 2:
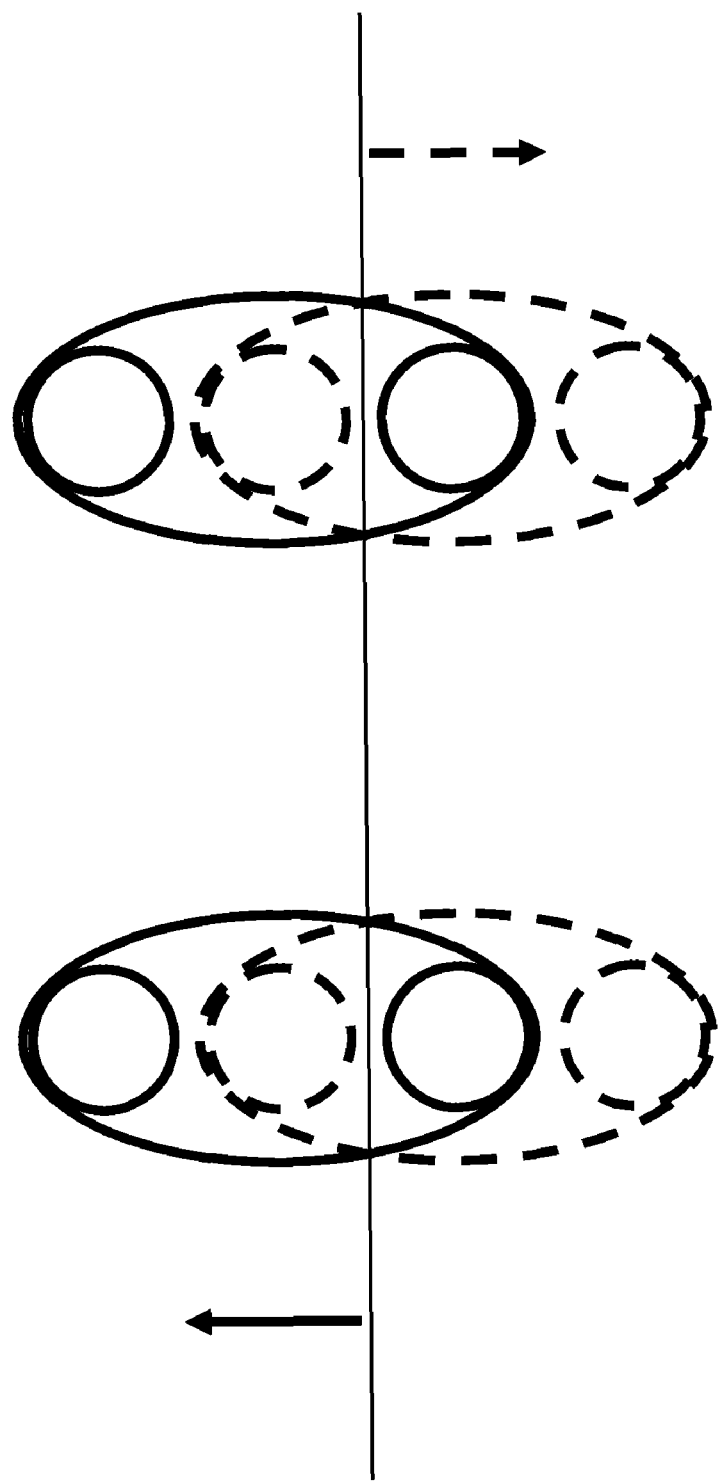
Figure 3:
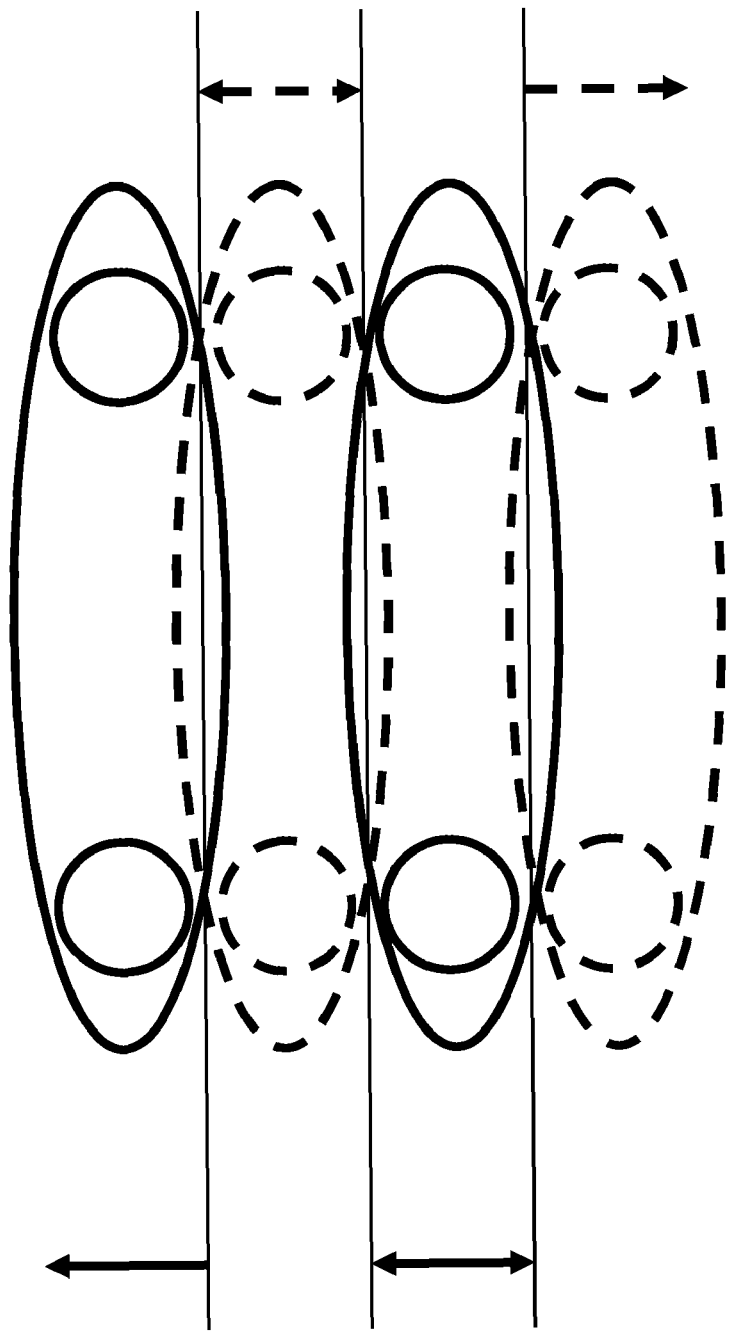

FIG. 1-3 shows this distinction. FIG. 1 shows the true distribution of two classes of data shown as solid and dashed circles. The horizontal lines are decision boundaries for the classes. Any data in the region marked by the horizontal line and in the direction of the solid arrows is more likely to belong to the solid class. Data in the other dashed regions are more likely belong to the dashed class.

In FIG. 2, the ellipses represent equal-probability contours for the classes. If each class is represented using Gaussians distributions, then the maximum likelihood procedure, which only tries to fit the distribution to the data, determines the distributions for each class. The determined distributions classes overlap, while the true distributions do not. A classifier that employs these distributions has the wrong decision boundaries, when compared with the true decision boundaries in FIG. 1.

FIG. 3 shows the distributions determined by the discriminative training procedure. These distributions are completely different than the true distributions in FIGS. 1-2. However, the decision boundaries obtained from these distributions do match the true decision boundaries in FIG. 1.

Figure 4:
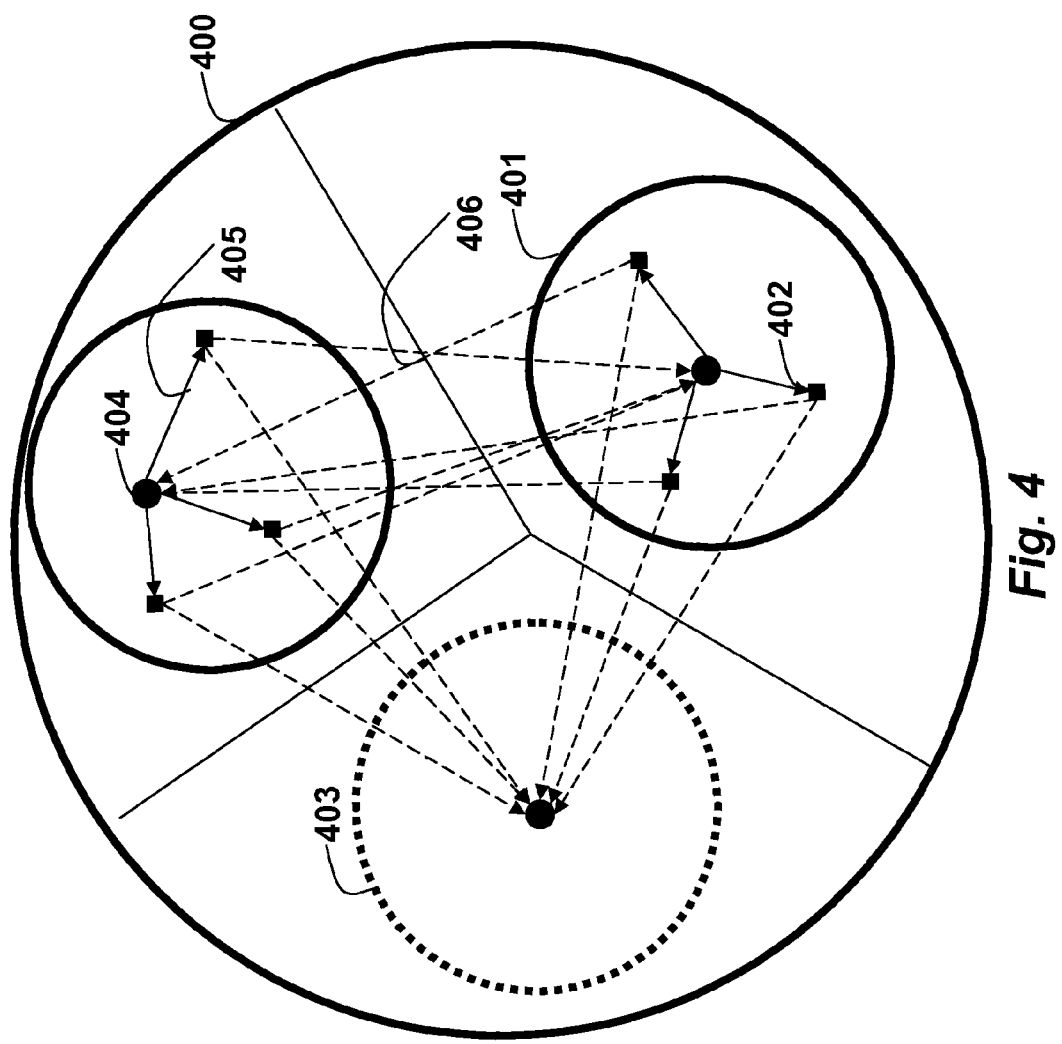
FIG. 4 schematic explaining how distributions are learned for a class for which no training data are available.

FIG. 4 schematically shows how distributions are learned for a class for which no data are available. The outer circle 400 represents an implicit soft or hard bound on the region within which all data lie, as specified by the a priori distribution.

Each of the solid inner circles 401 represents the distribution of classes for which data are observed. The squares 402 within each circle represent observed data from that class.

The dotted circle 403 represents the distribution of the class for which no data are observed. The dots 404 within each circle represent a parameter such as the mean of the distribution represented by the circles.

All data (squares) attract the parameters (dots) of the distributions of the classes to which they belong (encircling solid circles) towards themselves, as indicated by the solid arrows 405. All data also repel the parameters of other classes, as indicated by dashed arrows 406.

The parameters of classes for which data are observed (solid circles) are computed from both the attraction of data belonging to those classes and repulsion by data from other classes, as indicated by the fact that the dots in the solid circles have solid arrows directing them towards the data in their own class, and dashed arrows directing them away from data from other classes.

The parameters of the unseen class (dotted circle) are obtained purely by repulsion from data from other classes, as represented by the fact that the dot in the dotted circle only has dashed arrows directing it away from all observed data.

The global a priori distribution (represented by the large outer circle) ensures that the parameters of the unseen class are not pushed in an unbounded manner, or into an unreasonable region of the overall parameter space.

To obtain these results, the data from all classes are used to determine the distribution of any class. The general procedure for estimating model parameters for the distributions is iterative.

Estimating Distributions for Known Classes

Figure 5:
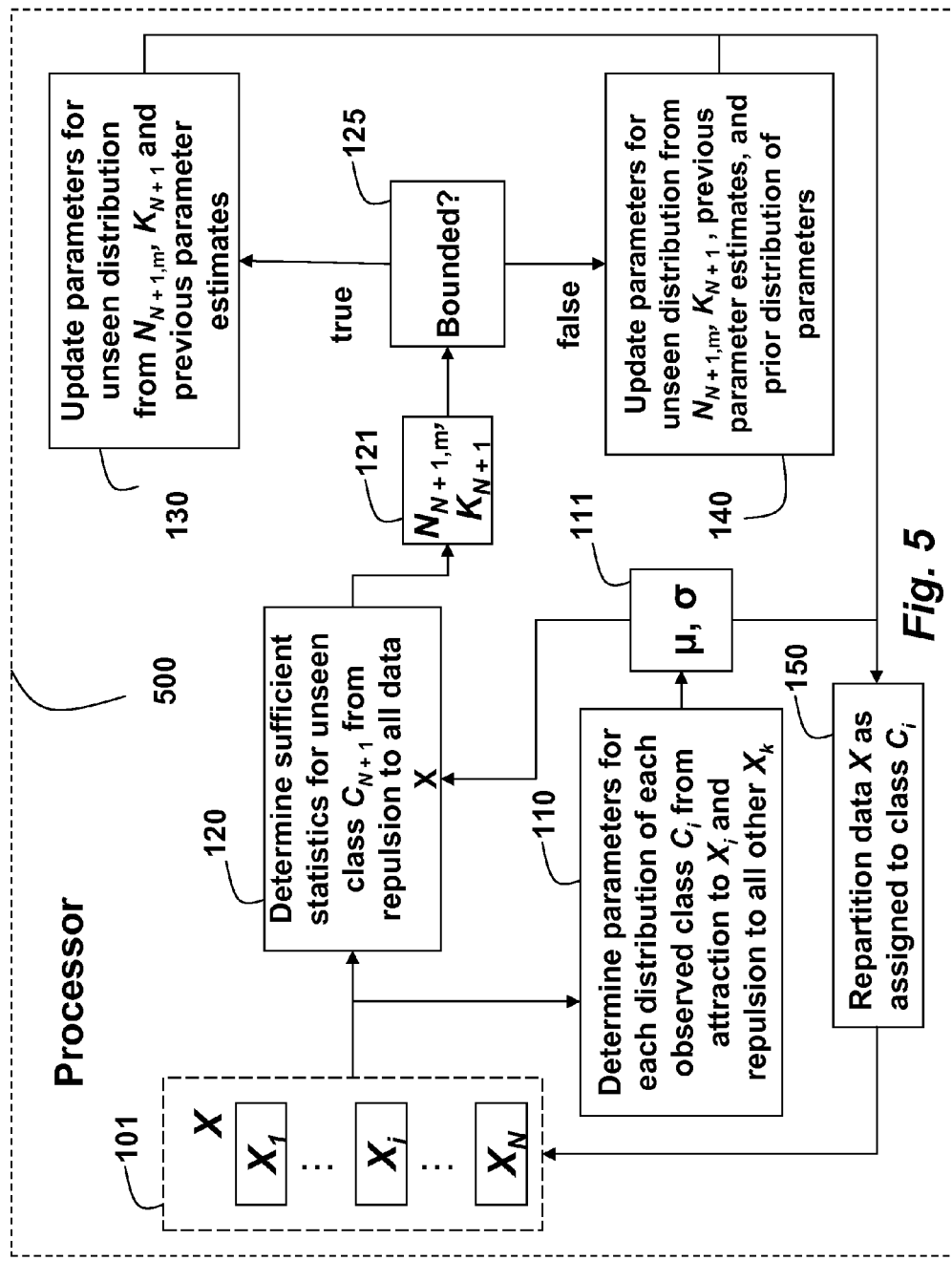
FIG. 5 is a block diagram for determining a distribution of an unobserved class for which there is no training according to embodiments of the invention.

FIG. 5 shows the method according to embodiments of the invention. The steps of the method are performed in a processor 500. As shown in FIG. 4, at each iteration, the sufficient statistics 111 are determined 110 for the distribution of each known class with known data X 101. For example, if the distribution of each class is a single Gaussian distribution, then the sufficient statistics are the mean $\mu$ and variance $\sigma$ of the distribution. The sufficient statistics that are obtained to estimate the mean of the distribution of the $n^{th}$ class, $C_n$ are $$N_{n,m} = \Sigma_{i\ in\ Cn} a_i X_i - \Sigma_{j\ out\ of\ Cn} b_j X_j, \text{ and}$$

$$K_n = \Sigma_{i\ in\ Cn} a_i - \Sigma_{j\ out\ of\ Cn} b_j.$$

The terms $a_i$ and $b_j$ are non-negative weighting terms. The specific value depends on the particular discriminative training method used. The first summation, i.e. $\Sigma_{i\ in\ Cn} a_i X_i$ in the estimation of $N_{n,m}$ or $\Sigma_{i\ in\ Cn} a_i$ in the estimation of $K_n$, is over all training data that belong to class $C_n$. Since they are positive contributions, they can be viewed as if they attracted the sufficient statistics, and consequently, the updated parameters, in the direction of the data points belonging to the class. The second summation, i.e. $-\Sigma_{j\ out\ of\ Cn} b_j X_j$ in the estimation of $N_{n,m}$ or $-\Sigma_{j\ out\ of\ Cn} b_j$ in the estimation of $K_n$, is over all data that do not belong to class $C_n$, i.e., rejected data. Since they are negative contributions, they can be viewed as if they repelled the sufficient statistics away from the data not belonging to the class.

The updated estimate for the mean is $$\mu'_n = (N_{n,m} + B_n \mu_n)/(K_n + B_n),$$

where $B_n$ is a balancing constant, which a proximity of a previous estimate to the current estimate of a given parameter. $B_n$ is specific for the parameter and the class. The actual value depends on the particular discriminative training method used. The variance can be similarly updated. Other distributions can also be determined.

The sufficient statistics $N_{n,m}$ and $K_n$ and the updated estimate $\mu'_n$ for the parameter for each class have both positive contributions from the data belonging to that class and negative contributions from data belonging to other classes.

Alternately viewed, the data from each associates with the distribution for that class, but repels the distributions for other classes.

Discriminative Training for an Unobserved Class

Let $C_{N+1}$ be the unobserved class for which there is no training data. We determine 120 the parameters 121 of the unobserved class completely from the data rejected from the other classes with known distributions. The sufficient statistics for mean of the unobserved class $C_{N+1}$ are $$N_{N+1,m} = -\Sigma_{j\ out\ of\ CN+1} g_j X_j, \text{ and}$$

$$K_{N+1} = -\Sigma_{j\ out\ of\ CN+1} g_j,$$

where $g_j$ are non-negative weights for data $X_j$.

In unobserved classes, there are no data points that we can associate with the unobserved class. Therefore, all data contributes negatively to the estimation of parameters of the unobserved class. In an alternate view, all data repels the unobserved class. The equations above reflect this fact. The negative sign before the summations imply that the contribution of the data point to the class's sufficient statistics is negative, repelling the data. The summations, i.e., $\Sigma_{j\ out\ of\ CN+1} g_j X_j$ and $\Sigma_{j\ out\ of\ CN+1} g_j$ are over all data $j$ not in the unobserved class $C_{N+1}$, i.e., all data in the training set. $N_{N+1,m}$ and $K_{N+1}$ are the sufficient statistics computed for the class $N+1$, i.e. the unobserved class, which is assumed to be a single Gaussian distribution, as an example, similar to the others described herein.

Two procedures 130 and 140 are used to estimate the mean of the unobserved class $C_{N+1}$, depending on whether they are bounded or not (125). After step 130 or step 140 is performed, The data X is repartitioned and assigned 150 to class $C_i$.

When the parameters of the data and distributions are bounded, the updated estimate 130 for the mean of the unobserved class is $$\mu'_{N+1} = (N_{N+1,m} + B_{N+1} \mu_{N+1})/(K_{N+1} + B_{N+1}). \text{ The estimate for the variance is obtained similarly.}$$

Other distributions, such Gaussian mixtures, hidden Markov models, conditional random fields, and histograms, can be updated similarly. The key feature is that the distribution of a class for which there is no data is determined by the rejection of the data from all the known classes.

However, the above updating can result in unbounded or unrealistic estimates for the parameter, e.g., the mean $\mu'_{N+1}$. To prevent this, the second procedure 140 bounds the value using an a priori probability distribution that specifies the distribution of the parameter values. This distribution restricts the values that the parameter can take by making unrealistic values highly unlikely and unbounded values impossible.

If the distribution for each class is Gaussian, then the update for the mean of the unobserved class $C_{N+1}$ is $$\mu'_{N+1} = (\alpha N_{N+1,m} + \beta \mu_{N+1} + \gamma \mu_p)/(K_{N+1} + B_{N+1} + \gamma),$$

where $\alpha$, $\beta$ and $\gamma$ are non-negative weights that depend on the specific discriminative training procedure used and the mechanism used to enforce the a priori distribution over the parameter. $\mu_p$ is the mean of the a priori probability distribution of the means of the classes.

The variance of the distribution can similarly be estimated. The specific form of the update for the variance depends on the form selected to represent the a priori probability distribution of the variances of the Gaussian distributions.

Other distributions, such Gaussian mixtures, hidden Markov models, conditional random fields, and histograms, can be updated similarly.

The key feature is that the distribution of the unobserved class for which there is no training data is determined from the rejection of the data from the known classes, constrained by the a priori probability distributions over the parameters.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for determining a distribution of an unobserved class for a classifier, the unobserved class having no known training data, comprising a processor for performing the steps of the method, comprising the steps of:

determining, for each known class, known distribution using known training data;

determining sufficient statistics of the distribution of the unobserved class from the known distributions and the training data associated with each known class:

determining if the known training data and the known distributions are bounded, and if true:

updating parameters of the distribution of the unobserved class from the sufficient statistics; else updating the parameters of the distribution of the unobserved class from sufficient statistics and a priori probability distributions that specify the distributions of the parameters.

2. The method of claim 1, wherein the method uses a discriminative training procedure.

3. The method of claim 2, wherein the discriminative training procedure uses minimum classification error training.

4. The method of claim 2, wherein the discriminative training procedure uses minimum phone error training.

5. The method of claim 2, wherein the discriminative training procedure uses minimum word error training.

6. The method of claim 2, wherein the discriminative training procedure uses maximum mutual information training.

7. The method of claim 2, wherein the discriminative training procedure uses maximum-margin training.

8. The method of claim 2, wherein the discriminative training procedure uses conditional random fields training.

9. The method of claim 1, wherein each distribution is independent of the other distributions.

10. The method of claim 1, wherein the distributions are Gaussian mixtures.

11. The method of claim 1, wherein the distributions are hidden Markov models.

12. The method of claim 1, wherein the parameters of the distribution of the unobserved class are determined by negative contributions from the training data for the observed classes.

13. The method of claim 1, wherein the unobserved class is a garbage class.

* * * * *